(12) United States Patent
Roux et al.

(10) Patent No.: US 7,325,642 B2
(45) Date of Patent: Feb. 5, 2008

(54) MOTOR VEHICLE FENDER HAVING A BREAKABLE ZONE

(75) Inventors: Jean-Pierre Roux, Villefranche S/Saone (FR); Hugues Cheron, Meximieux (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 249 days.

(21) Appl. No.: 10/767,452

(22) Filed: Jan. 29, 2004

(65) Prior Publication Data

US 2004/0262895 A1 Dec. 30, 2004

(30) Foreign Application Priority Data

Jan. 29, 2003 (FR) .................................. 03 00992

(51) Int. Cl.
 *B60R 21/34* (2006.01)
(52) U.S. Cl. .................. 180/274; 293/132; 296/187.04
(58) Field of Classification Search ................ 293/107, 293/132, 133, 109; 296/187.04, 187.03, 296/193.09, 198; 180/271, 274; *B60R 21/34*
See application file for complete search history.

(56) References Cited

U.S. PATENT DOCUMENTS

| 4,488,745 A | * | 12/1984 | Stokes ........................ 293/155 |
| 4,995,659 A | * | 2/1991 | Park ........................... 293/107 |
| 6,341,813 B1 | * | 1/2002 | Taghaddos ............. 296/187.06 |
| 6,416,093 B1 | * | 7/2002 | Schneider .................... 293/107 |
| 6,497,183 B2 | * | 12/2002 | Demarquilly et al. .... 105/392.5 |
| 6,698,820 B2 | * | 3/2004 | Nakata ................... 296/193.09 |
| 6,749,218 B2 | * | 6/2004 | Breed ......................... 280/735 |
| 6,923,483 B2 | * | 8/2005 | Curry et al. ................. 293/107 |
| 2005/0140174 A1 | * | 6/2005 | Fayt et al. ............. 296/187.04 |

FOREIGN PATENT DOCUMENTS

| DE | 44 14 432 | | 11/1995 |
| DE | 19948181 A1 | * | 4/2001 |
| DE | 100 56 796 | | 5/2002 |
| DE | 10239352 A1 | * | 3/2004 |
| DE | 10251279 A1 | * | 5/2004 |
| FR | 2 825 052 | | 11/2002 |
| FR | 2852564 A1 | * | 9/2004 |
| WO | WO 02055343 | * | 7/2002 |

* cited by examiner

*Primary Examiner*—Paul N. Dickson
*Assistant Examiner*—Drew J. Brown
(74) *Attorney, Agent, or Firm*—James R. Williams

(57) ABSTRACT

The disclosure concerns a motor vehicle fender made of plastics material having a skin separating the inside and the outside of the fender, wherein the skin possesses a breakable zone suitable for opening when subjected to thrust from the inside towards the outside of the fender. The inside of the airbag housing is situated in register with the breakable zone.

6 Claims, 1 Drawing Sheet

MOTOR VEHICLE FENDER HAVING A BREAKABLE ZONE

The present invention relates to the field of safety for pedestrians involved in road traffic accidents.

BACKGROUND OF THE INVENTION

It is known that the regions of the bodywork of a motor vehicle surrounding the junctions between each front fender and the hood are particularly dangerous for pedestrians since said regions are very rigid.

BRIEF SUMMARY OF THE INVENTION

The invention seeks to protect pedestrians by deploying airbags outside the vehicle to cover those dangerous regions and prevent or dampen any impacts against them.

To this end, the invention provides a motor vehicle fender having a skin separating the inside and the outside of the fender, wherein said skin possesses a breakable zone suitable for opening when subjected to thrust from the inside towards the outside of the fender.

According to other advantageous features of the invention:
the fender is made of plastics material, for example of a thermoplastic material or a thermosetting material;
the inside of the fender includes an airbag housing situated in register with the breakable zone; and
the airbag housing is integrally molded with the fender made of plastics material.

DETAILED DESCRIPTION OF THE INVENTION

Figure 1:
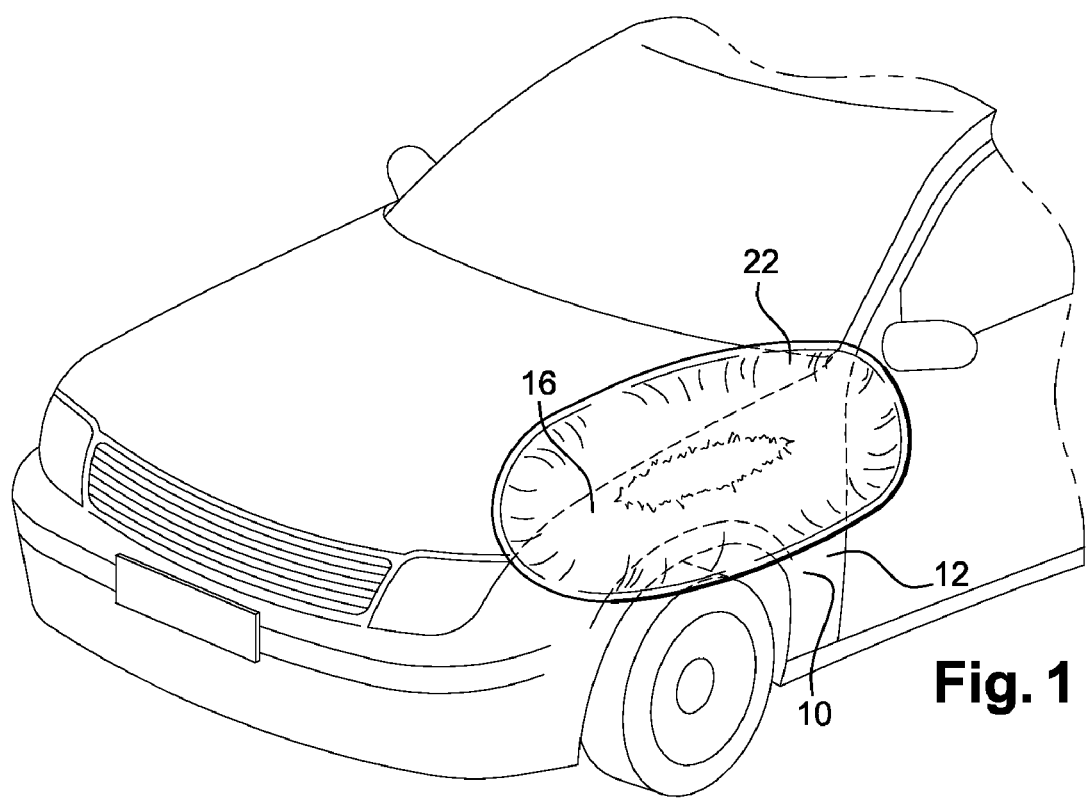
FIG. 1 is a schematic view of a motor vehicle fender according to the invention.
Figure 2:
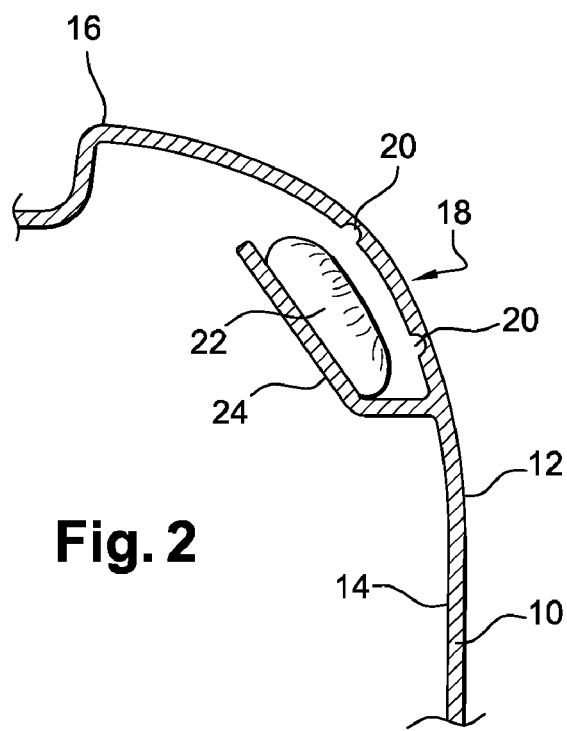
FIG. 2 is a schematic view of a transversal cut of the fender of FIG. 1.

There follows a detailed description of an embodiment of the invention given by way of example.

A motor vehicle front fender 10 is formed from NORYL® GTZ, which is a polymer blend comprising polyamide reinforced with modified polyphenylene ether polymer. The fender 10 comprises a skin having an outside face 12 and an inside face 14. The outside face 12 of the fender 10 is intended to be exposed and visible from outside the vehicle, while the inside face 14 is intended to face towards the inside of the vehicle when the fender 10 is in position on the vehicle. The outside face 12 is thus on the outside of the fender 10 and thus the inside face 14 is on the inside of the fender 10.

The thickness of the skin is substantially equal to 2 millimeters (mm).

The fender 10 generally occupies a vertical plane (when in position on the vehicle) and is terminated on top by a top edge 16 close to the hood.

In the vicinity of this edge 16, a substantially rectangular breakable zone 18 is defined by a shallow groove 20, e.g. having a depth of 1 mm.

To preserve the appearance of the fender 10, the groove 20 is formed in the inside face 14 only, the outside face 12 being uniform, including over the groove 20.

This groove 20 forms a line of weakness that gives way to open up a rectangular passage through the fender 10 in the event of thrust coming from inside the fender 10 and acting towards the outside.

This thrust can result from the violent deployment of an airbag 22 housed in a housing 24 located on the inside face 14 of the fender 10 in register with the breakable zone 18 defined by the groove 20. The housing 24 may either be fitted to the fender 10 or it may be integrally molded therewith.

This particular embodiment is described purely by way of example and does not present any limiting character.

The invention claimed is:

1. A side fender for a motor vehicle comprising a skin separating an inside and an outside of the fender, wherein the skin includes a breakable zone that opens when subjected to thrust from the inside towards the outside of the fender, and the inside of the fender includes an airbag housing.

2. The side fender of claim 1, consisting of plastics material.

3. The motor vehicle side fender of claim 1, wherein the breakable zone comprises a shallow groove.

4. The side fender of claim 3, wherein the inside face of the fender includes the groove and the outside face of the fender is uniform including over the groove.

5. The motor vehicle side fender of claim 1, wherein the breakable zone is substantially rectangular.

6. The fender according to claim 1, in which the airbag housing is integrally molded with the fender and the fender consists essentially of plastics material.

* * * * *